(12) United States Patent
Kondor et al.

(10) Patent No.: US 11,773,942 B2
(45) Date of Patent: Oct. 3, 2023

(54) HYDRAULIC MOUNT AND METHOD OF PRODUCING A HYDRAULIC MOUNT

(71) Applicant: Sumitomo Riko Company Limited, Aichi (JP)

(72) Inventors: Jozsef Kondor, Künzell (DE); Dennis Leip, Wächtersbach (DE)

(73) Assignee: Sumitomo Riko Company Limited, Aichi (JP)

( * ) Notice: Subject to any disclaimer, the term of this patent is extended or adjusted under 35 U.S.C. 154(b) by 465 days.

(21) Appl. No.: 16/993,236

(22) Filed: Aug. 13, 2020

(65) Prior Publication Data
US 2021/0062888 A1   Mar. 4, 2021

(30) Foreign Application Priority Data

Aug. 27, 2019   (DE) ...................... 10 2019 006 047.4

(51) Int. Cl.
  *F16F 13/14*   (2006.01)
  *B29C 45/14*   (2006.01)
  (Continued)

(52) U.S. Cl.
  CPC ........ *F16F 13/14* (2013.01); *B29C 45/14008* (2013.01); *B29C 45/14491* (2013.01);
  (Continued)

(58) Field of Classification Search
  CPC ..... F16F 13/14; F16F 13/1463; F16F 13/1481
  See application file for complete search history.

(56) References Cited

U.S. PATENT DOCUMENTS

| 4,964,623 A * | 10/1990 | Thorn ..................... F16F 13/14 |
| | | 267/140.12 |
| 2007/0246870 A1* | 10/2007 | Siemer ................ F16F 13/1463 |
| | | 267/140.12 |

(Continued)

FOREIGN PATENT DOCUMENTS

| CN | 102166809 | 8/2011 |
| CN | 105443631 | 3/2016 |

(Continued)

OTHER PUBLICATIONS

Office Action of China Counterpart Application, with English translation thereof, dated Jul. 27, 2022, pp. 1-17.

(Continued)

*Primary Examiner* — Melanie Torres Williams
(74) *Attorney, Agent, or Firm* — JCIPRNET

(57) ABSTRACT

A hydraulic mount is provided and includes: an inner core, a cage that surrounds the inner core, an elastomer body that extends between the inner core and the cage and elastically connects them to each other, and an outer sleeve that encloses the cage. The elastomer body has a first circumferential fluid chamber recess and a second circumferential fluid chamber recess. The first fluid chamber recess and the second fluid chamber recess are each limited in a radially outwards direction by the outer sleeve to form a first fluid chamber and a second fluid chamber. The elastomer body is configured to be substantially undercut-free in an axial direction on its axial end faces. The elastomer body and the cage are configured to be substantially undercut-free in the region of the first fluid chamber recess and the second fluid chamber recess, at least in two predetermined, mutually opposite radial directions.

13 Claims, 12 Drawing Sheets

(51) Int. Cl.
  *B29K 21/00*     (2006.01)
  *B60G 15/06*     (2006.01)
  *B29L 31/30*     (2006.01)

(52) U.S. Cl.
  CPC .... *B29C 45/14819* (2013.01); *F16F 13/1445* (2013.01); *F16F 13/1463* (2013.01); *F16F 13/1481* (2013.01); *B29K 2021/003* (2013.01); *B29K 2021/006* (2013.01); *B29L 2031/30* (2013.01); *B60G 15/067* (2013.01); *B60G 2204/128* (2013.01); *F16F 2226/04* (2013.01)

(56) References Cited

U.S. PATENT DOCUMENTS

2010/0140856 A1*  6/2010  Endo .................. F16F 13/14
                                                  267/140.12
2016/0195155 A1    7/2016  Udwig et al.
2019/0170207 A1*  6/2019  Molesworth ........ F16F 13/1454

FOREIGN PATENT DOCUMENTS

| EP | 0458008    | 11/1991 |
| JP | 2006214526 | 8/2006  |
| JP | 2019060393 | 4/2019  |

OTHER PUBLICATIONS

Office Action of China Counterpart Application, with English translation thereof, dated Dec. 23, 2021, pp. 1-22.
"Office Action of Germany Counterpart Application" with English translation thereof, dated Apr. 29, 2020, p1-p15.

\* cited by examiner

HYDRAULIC MOUNT AND METHOD OF PRODUCING A HYDRAULIC MOUNT

CROSS REFERENCE TO RELATED APPLICATIONS

This application claims the priority benefit of German Patent Application No. 10 2019 006 047.4, filed on Aug. 27, 2019. The entirety of the above-mentioned patent application is hereby incorporated by reference herein and made a part of this specification.

TECHNICAL FIELD

The disclosure relates to a hydraulic mount, such as a suspension strut support mount, and to a method of producing a hydraulic mount, such as a suspension strut support mount.

BACKGROUND ART

Hydraulic suspension strut support mounts already exist in the prior art. From the point of view of their construction, however, they are very complex and therefore expensive to produce.

In the European patent specification 0 458 008 B1, for example, a suspension strut support mount is described in which the support spring lies outside the hydraulic module, which has a negative effect on the damping performance since the hydraulic module only operates in a certain amplitude range. Moreover, the construction of this mount is very complex and consists of many individual parts.

SUMMARY

The present disclosure provides a hydraulic mount with a relatively small space requirement, which can be produced simply and cheaply.

This disclosure can be achieved by providing a hydraulic mount and a method of producing a hydraulic mount according to the independent claims. Preferred embodiments can be taken from the respective dependent claims.

A first aspect of the disclosure relates to a hydraulic mount, comprising: an inner core; a cage that surrounds the inner core; an elastomer body that extends between the inner core and the cage, and the elastomer body elastically connects the inner core and the cage to each other; and an outer sleeve that encloses the cage, wherein the elastomer body has a first circumferential fluid chamber recess and a second circumferential fluid chamber recess, wherein the first fluid chamber recess and the second fluid chamber recess are each limited in a radially outwards direction by the outer sleeve to form a first fluid chamber and a second fluid chamber, wherein the elastomer body is configured so as to be substantially undercut-free in an axial direction on axial end faces of the elastomer body, and wherein the elastomer body and the cage are configured so as to be substantially undercut-free in the region of the first fluid chamber recess and the second fluid chamber recess, at least in two predetermined, mutually opposite radial directions.

Advantageously, the hydraulic mount according to the disclosure can be produced more simply, in a more compact configuration and more cheaply than conventional mounts of this type, as a suspension strut support mount, nevertheless having good damping and isolation from vertical ground vibrations. Because the axial end faces of the elastomer body are configured so as to be substantially undercut-free and the fluid chamber recesses of the elastomer body are configured so as to be substantially undercut-free, the elastomer body of the mount can be formed in one step in a mold using axial sliders and/or radial sliders. The mount can be configured to provide strong damping of primarily low-frequency vibrations. However, the structural design of the mount is significantly simpler than for conventional mounts, such as suspension strut support mounts.

Within the framework of this application, all indications of spatial directions, "top", "bottom" and "vertical", refer to the z-axis of a three-dimensional system of coordinates, the origin of which lies approximately in the center of gravity of the mount according to the disclosure and which is oriented such that the z-axis represents one of the principal axes of inertia of the mount. Accordingly, the indication "axial" relates to the z-axis on the one hand and the indication "radial" relates to the x-y plane spanned by the x- and y-axis of the system of coordinates on the other hand, which extends orthogonally to the z-axis. In other words, "radial" relates to indications of directions perpendicular to the z-axis. The indication "horizontal" likewise relates to the x-y plane. The indication "transverse" in the case of the mount according to the disclosure relates to directions along the x-y plane or parallel to the x-y-plane, while the indication "longitudinal" denotes the directions along or parallel to the z-axis.

The term "surround" within the framework of this application can mean that the cage of the mount according to the disclosure frames, bounds or encircles the inner core and partially limits the inner core in a radial direction and in a circumferential direction around the z-axis. In other words, in a state of the mount without an elastomer body, the cage can represent a radial limit for the inner core. On the other hand, the term "enclose" within the framework of this application can mean that the outer sleeve limits the cage completely in a radial direction and in a circumferential direction for the height of the cage in a vertical direction, and thus envelops the cage.

The term "circumferential" within the framework of this application can mean that the fluid chamber recesses substantially run in a curved or circular path around the z-axis.

The inner core can be formed for connection to a shock absorber rod. To this end, the inner core can comprise a mounting disc. The mounting disc can have a recess in the middle, through which a stepped, free end of the shock absorber rod can be fed for connection to the mounting disc, e.g. using a nut. The mounting disc can be made of a metal, such as e.g. steel. The inner core can be produced simply by overmolding the mounting disc with plastic. The inner core can be configured such that it is substantially cylindrical. The mounting disc can be configured such that it is angled outwards in a radial direction. The mounting disc can be bent in a hook shape. The mounting disc can be configured such that it is rotationally symmetrical relative to an axis perpendicular to the plane in which the mounting disc substantially extends.

The cage can be made of plastic or metal, e.g. aluminum. The axial end faces of the cage can be substantially completely covered with the material of the elastomer body. The cage can be substantially completely embedded in the elastomer body. However, the cage can also be at least partially exposed in a radially outwards direction so that it can be more readily connected to the outer sleeve. The cage can be configured such that it is substantially cylindrical.

The outer sleeve can be made of plastic or metal. The outer sleeve can have an axial extension that substantially corresponds to the axial extension of the cage and/or of the elastomer body. The first and second fluid chambers can be at least partially sealed in a fluid-tight manner by the outer sleeve in a radially outwards direction. The outer sleeve can be connected to a flange to connect the hydraulic mount to a vehicle frame, for example. The outer sleeve can be configured such that it is substantially cylindrical.

The elastomer body is made of an elastomer material. The elastomer body can represent a single, cohesive component, or can be made up of individual, separate components. The elastomer body is configured so as to be undercut-free on each of its axial end faces in an axial direction away from the elastomer body, so that after the elastomer body has been formed in a mold, a slider or a pair of sliders can be withdrawn in an axial direction or the elastomer body can be removed from the mold in an axial direction after being formed in the mold. "Configured so as to be undercut-free" means that there is no undercut during production of the elastomer body and/or in the unloaded state of the elastomer body.

The elastomer body and the cage are configured so as to be substantially undercut-free in the region of the first fluid chamber recess and the second fluid chamber recess, at least in two predetermined, mutually opposite radial directions, so that after the elastomer body has been formed in a mold, a pair of sliders can be withdrawn in the mutually opposite radial directions. The elastomer body and the cage can also be configured so as to be substantially undercut-free in all radial directions in the region of the first fluid chamber recess and the second fluid chamber recess. In other words, the first fluid chamber recess and the second fluid chamber recess are configured so as to be substantially undercut-free in two predetermined, mutually opposite radial directions and can also be configured so as to be substantially undercut-free in all radial directions. "Configured so as to be substantially undercut-free" means that during production of the elastomer body and/or in the unloaded state of the elastomer body there is no undercut, or that there is only a small degree of undercut, such as only in readily deformable regions of the elastomer body. Furthermore, "configured so as to be substantially undercut-free" can mean that, in an assembled state of the mount, there is no undercut on the elastomer body or that there is only a small degree of undercut on the elastomer body, such as only in readily deformable regions of the elastomer body. "Substantially undercut-free" can mean that, during production of the elastomer body, it is possible to withdraw a slider without damaging or destroying the elastomer body.

The cage can comprise a first support ring and a second support ring, wherein the first support ring can be arranged on a first axial end section of the hydraulic mount, wherein the second support ring can be arranged on a second axial end section of the hydraulic mount which is opposite the first axial end section, and wherein the first fluid chamber and the second fluid chamber can be arranged between the first support ring and the second support ring in the axial direction.

The cage can furthermore comprise two connecting webs that extend in the axial direction between the first support ring and the second support ring, and the connecting webs connect the first support ring and the second support ring, and wherein the two connecting webs can be arranged at two diametrically opposed positions of the first support ring and the second support ring transverse to the predetermined, mutually opposite radial directions.

The cage can exclusively comprise two connecting webs. However, the cage can also comprise more than two connecting webs, e.g. 3, 4, 5, 6, 7, 8 or more connecting webs.

The cage can moreover comprise an intermediate ring, which can be arranged between the first support ring and the second support ring in the axial direction, and the intermediate ring can be connected to the first support ring and the second support ring by way of the two connecting webs.

The intermediate ring can be arranged between the first fluid chamber recess and the second fluid chamber recess in an axial direction.

The first fluid chamber and the second fluid chamber are at least partially outwardly limited in a radial direction by the outer sleeve, while the first fluid chamber and the second fluid chamber are at least partially inwardly limited in a radial direction by the elastomer body. The first fluid chamber is at least partially upwardly limited in an axial direction by the elastomer body. The second fluid chamber is at least partially downwardly limited in an axial direction by the elastomer body.

The first fluid chamber and the second fluid chamber can be fluidically connected to each other by way of a fluid channel, wherein the fluid channel can be limited in a radially outwards direction by the outer sleeve.

When the mount is under load, a damping fluid can flow from the first fluid chamber into the second fluid chamber via the fluid channel, so that vibrations can be damped.

The fluid channel can be at least partially formed on the cage, and at least partially on the first support ring, on the second support ring, on one or both connecting webs and/or on the intermediate ring.

Advantageously, the damping of the mount can be influenced by the geometry of the fluid channel and by the length and/or cross-section of the fluid channel. For example, by enlarging the length of the fluid channel and/or enlarging the cross-section of the mount, the damping of the mount can be increased.

The hydraulic mount can comprise a multi-part shell element, which is arranged between the elastomer body and the outer sleeve, wherein the fluid channel can be formed on the multi-part shell element.

Advantageously, the hydraulic mount can be manufactured in a compact configuration and significantly more easily because the fluid channel geometry does not have to be incorporated in the elastomer body or the cage during production. Thus, the fluid channel geometry can easily be adapted to meet the requirements by modifying only the shell element.

The shell element can be arranged on the elastomer body or on the cage after the elastomer body has been formed and before the outer sleeve has been connected to the elastomer body. The cage can have exposed support edges on which the shell element rests. However, the shell element can also rest on the elastomer body. The shell element can be in two parts, for example. The shell element can be made of plastic or metal. The shell element can partially limit the first fluid chamber recess and the second fluid chamber recess in a radially outwards direction, wherein connecting sections can be formed on the shell element which fluidically connect the fluid channel to the first fluid chamber recess and the second fluid chamber recess. The shell element can substantially completely enclose the elastomer body in a circumferential direction. The axial extension of the shell element can substantially correspond to the axial extension of the elastomer body and/or of the outer sleeve.

Alternatively or in addition, the fluid channel can be formed on the elastomer body between the first fluid chamber recess and the second fluid chamber recess, wherein the elastomer body can have at least one lip projecting substantially radially outwards in the region of the fluid channel, which can extend along a circumferential direction of the elastomer body. The elastomer body can have at least two lips projecting substantially radially outwards at a distance from one another in an axial direction in the region of the fluid channel, which extend along a circumferential direction of the elastomer body. The lips can be configured such that they are lamellar or block-like. For example, the elastomer body can comprise a block projecting substantially radially outwards in the region of the fluid channel, which extends along a circumferential direction of the elastomer body.

Advantageously, a fluid channel designed in this way enables vibrations up to about 200 Hz, or even more depending on the design, to be isolated by means of the lips, with the lowest possible dynamic hardening occurring so that the dynamic stiffness can in some cases be lower than the static stiffness. This is facilitated by the fact that the lips can vibrate in an axial direction during operation of the mount. The number of lips and the gap size with respect to the outer sleeve can be designed such that it is variable. The lips can also act as a pressure-relief valve, which opens at a specific pressure. It is furthermore advantageous that, with the aid of the lips, the mount can also be employed as an acoustic mount since noise reduction is accomplished.

The fluid channel with the radially outwardly projecting lips can be formed between the first fluid chamber recess and the second fluid chamber recess in an axial direction, such as on a radially outer section of the elastomer body. The free ends of the lips can be arranged at a distance from the inner surfaces of the outer sleeve, or can be at least partially in contact with the inner surfaces of the outer sleeve. The fluid channel can comprise 1, 2, 3, 4, 5, 6, 7, 8 or more lips. With the number of lips, the stiffness of each individual lip can be reduced, which facilitates the vibration of the lips.

The elastomer body can be supported radially from inside by the inner core or the intermediate ring in the region of the fluid channel.

The elastomer body can furthermore comprise a first membrane, a second membrane and an intermediate section, wherein the first fluid chamber can be limited by the first membrane in an axially outwards direction, wherein the second fluid chamber can be limited by the second membrane in an axially outwards direction, and wherein the intermediate section can be arranged between the first fluid chamber and the second fluid chamber in the axial direction.

The intermediate section of the elastomer body can act as a spring here and can separate the first fluid chamber from the second fluid chamber. The intermediate section can be configured as a V-spring (see e.g. FIG. 2, reference number 40). The elastomer body is vulcanized with the cage and the inner core.

The first membrane and/or the second membrane can be of convex configuration.

The durability of the elastomer body can be improved by the convex shape of the first membrane and/or the second membrane that bulges out in an axially outwards direction, since the membranes deform in a rolling manner during operation of the mount, which entails lower strain. Furthermore, as a result of the convex shape, a planar impact during operation is avoided, which reduces noise generation during operation.

The first membrane, the second membrane and/or the intermediate section can be configured as a support spring.

A second aspect of the disclosure relates to a method of producing a hydraulic mount, wherein the method comprises the following steps: inserting an inner core into a mold, inserting a cage into the mold in such a way that the cage surrounds the inner core, closing the mold, introducing at least one axial slider into the mold, introducing at least one pair of radial sliders into the mold, injecting an elastomer material into the mold, completely vulcanizing the elastomer material to form an elastomer body that elastically connects the inner core and the cage and to shape a mount component unit, wherein the mount component unit comprises the inner core, the elastomer body and the cage, withdrawing the at least one axial slider and the at least one pair of radial sliders, opening the mold, removing the mount component unit from the mold, and connecting the mount component unit to an outer sleeve.

The above explanations relating to the hydraulic mount also apply mutatis mutandis to the method described here.

Advantageously, a hydraulic mount, such as a suspension strut support mount, can be produced more simply, in a more compact configuration and more cheaply than conventional mounts of this type by the method according to the disclosure.

Connecting the mount component unit to the outer sleeve can comprise pressing the mount component unit into the outer sleeve such that the mount component unit and the outer sleeve are at least partially in contact, or placing the outer sleeve over the mount component unit such that the mount component unit and the outer sleeve are at least partially in contact. Before the mount component unit is connected to the outer sleeve, the shell element can be arranged on the elastomer body or on the mount component unit.

There follows a description of the figures, which are intended to serve as examples to illustrate a number of embodiments of the first aspect. It goes without saying that the subject matter of the disclosure is not limited to the embodiments described below. Individual features can be combined to form further embodiments.

DESCRIPTION OF EMBODIMENTS

Figure 1:
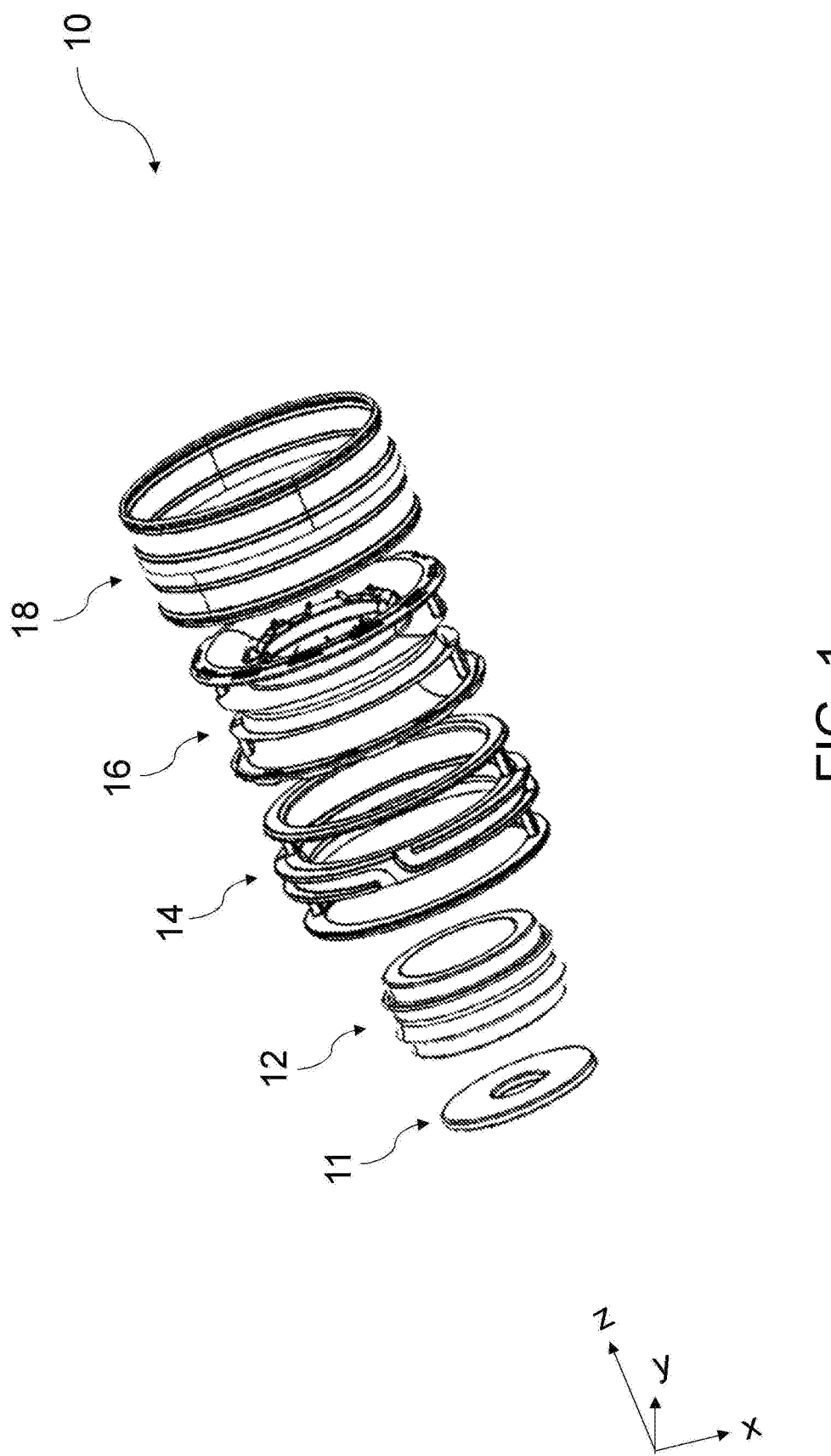
FIG. 1 is an exploded view of an embodiment of the mount according to the disclosure.

FIG. 1 shows the construction of the mount 10 with the aid of an exploded view. The mount 10 comprises an annular mounting disc 11, which is overmolded with a plastic to form the inner core 12. The inner core 12 together with the mounting disc 11 is inserted in a mold with the cage 14. Elastomer material is then injected into the mold and around the cage 14 and around the inner core 12, whereby the elastomer body 16 is shaped and vulcanized on to the cage 14 and the inner core 12. The elastomer body 16 is shaped in such a way that, both in an axial direction and in at least two mutually opposite radial directions, it has no undercuts. After demolding, the outer sleeve 18 is connected to the cage 14 or the elastomer body. The unit comprising—from inside to outside—the mounting disc 11, the inner core 12, the elastomer body 16 and the cage 14 is pushed or pressed into the outer sleeve 18, or the outer sleeve 18 is placed or pushed over this unit and optionally calibrated or pressed in.

Figure 2:
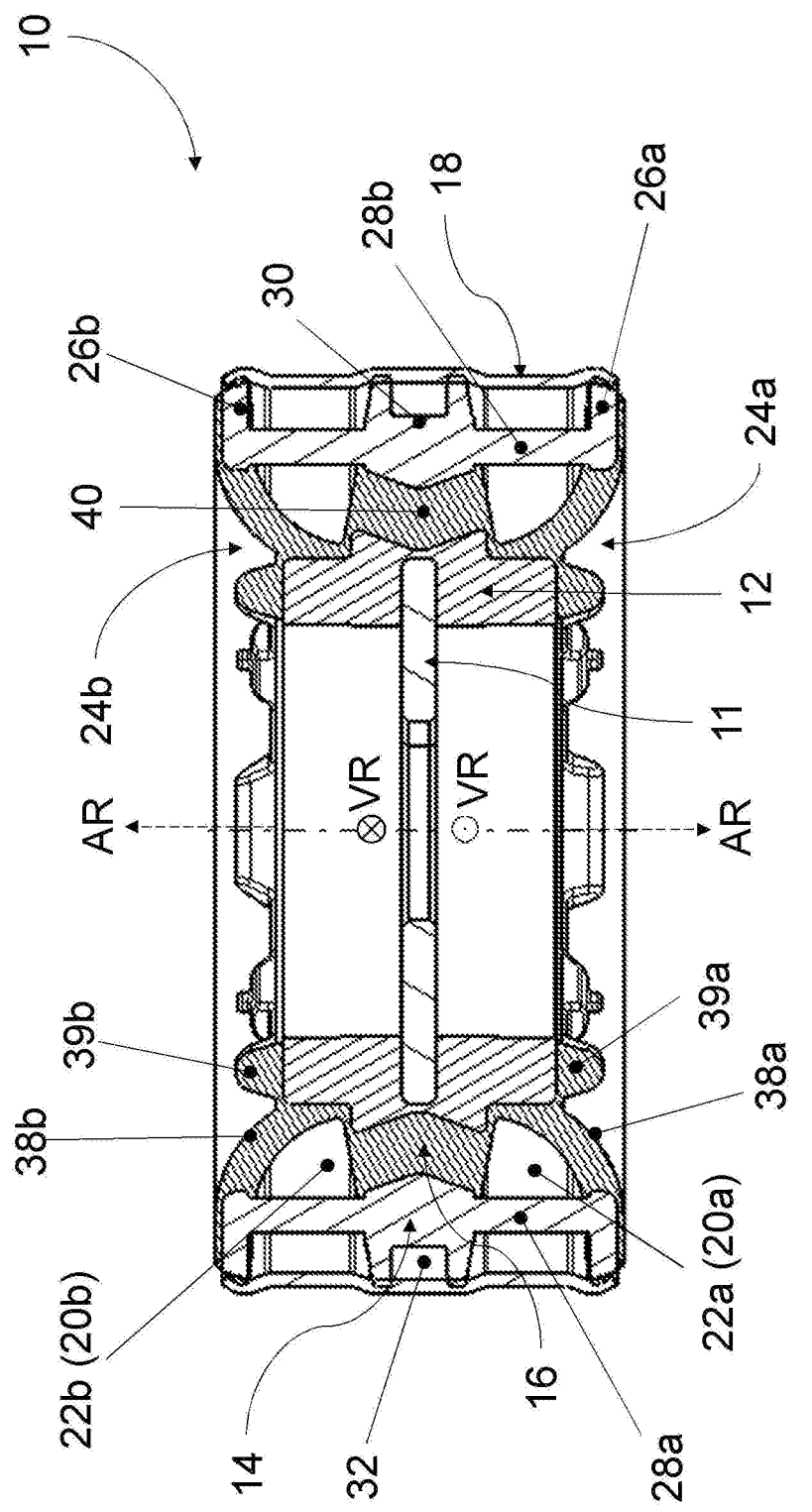
FIG. 2 is a cross-sectional view of the embodiment according to FIG. 1.

FIG. 2 shows the mount 10 from FIG. 1 in a cross-section along a central axis of the mount 10. For the sake of simplicity, the mount 10 has been oriented in space such that the cross-section is symmetrical relative to the z-axis of the system of coordinates illustrated. In addition, the mount 10 is oriented such that the predetermined, mutually opposite radial directions VR run along or parallel to the y-axis of the alternatively indicated system of coordinates, i.e. into or out of the drawing plane, and the axial directions AR run along or parallel to the z-axis of the system of coordinates indicated. From inside to outside, FIG. 2 shows the inner core 12 comprised by the mount 10 with mounting disc 11, the elastomer body 16 and the cage 14. The elastomer body 16 is arranged between the inner core 12 and the cage 14 in a radial direction or in the x- and y-directions—in the x-direction in the cross-section shown. The elastomer body 16 is vulcanized on to the inner core 12 with its radial inside and on to the cage 14 with its radial outside. FIG. 2 shows by way of example that the end faces 24a, 24b of the elastomer body 16 are configured so as to be undercut-free in an axial direction AR—here in the z-direction or in the direction opposite the z-direction. In an axial direction, i.e. along the z-axis, the first membrane 38a and the second membrane 38b extend downwards and upwards from the intermediate section 40. On the bottom axial end face 24a and the top axial end face 24b of the elastomer body 16, the bottom membrane 38a and the top membrane 38b each have at least one radially inner bulge 39a and 39b projecting axially from the inner core 12, which also act as stop dampers during operation of the mount 10. The elastomer body 16 is configured in a funnel shape on its axial end faces 24a and 24b, and is configured so as to be undercut-free in an axial direction.

From bottom to top in an axial direction, the cage 14 comprises a support ring 26a, an intermediate ring 30 and a support ring 26b. In the intermediate ring 30 an annular recess is formed on the side of the intermediate ring 30 facing away from the intermediate section 40 of the elastomer body 16, which annular recess forms the fluid channel 32 limited by the intermediate ring 30 of the cage 14 and the outer sleeve 18. The support ring 26a, the intermediate ring 30 and the support ring 26b are connected together by the connecting webs 28a and 28b that are shown, wherein the connecting webs 28a and 28b are part of the cage 14. The membrane 38a and the membrane 38b are each vulcanized on to the support ring 26a and the support ring 26b. In the present case, the two predetermined, mutually opposite radial directions correspond to the positive and negative y-directions.

As a result of the arrangement of the elastomer body 16, the cage 14 and the outer sleeve 18, the fluid chambers 22a and 22b that run substantially parallel to one another around the z-axis are obtained, which are fluidically connected to each other via the fluid channel 32 i.e. damping fluid can flow from the first fluid chamber 22a into the second fluid chamber 22b or vice versa when the mount 10 is under load. The fluid chambers 22a and 22b are limited radially by the outer sleeve 18 and the membranes 38a and 38b respectively of the elastomer body 16 and axially by the intermediate ring 30 of the cage 14, the intermediate section 40 of the elastomer body 16 and the support rings 26a, 26b and the membranes 38a, 38b.

Figure 3:
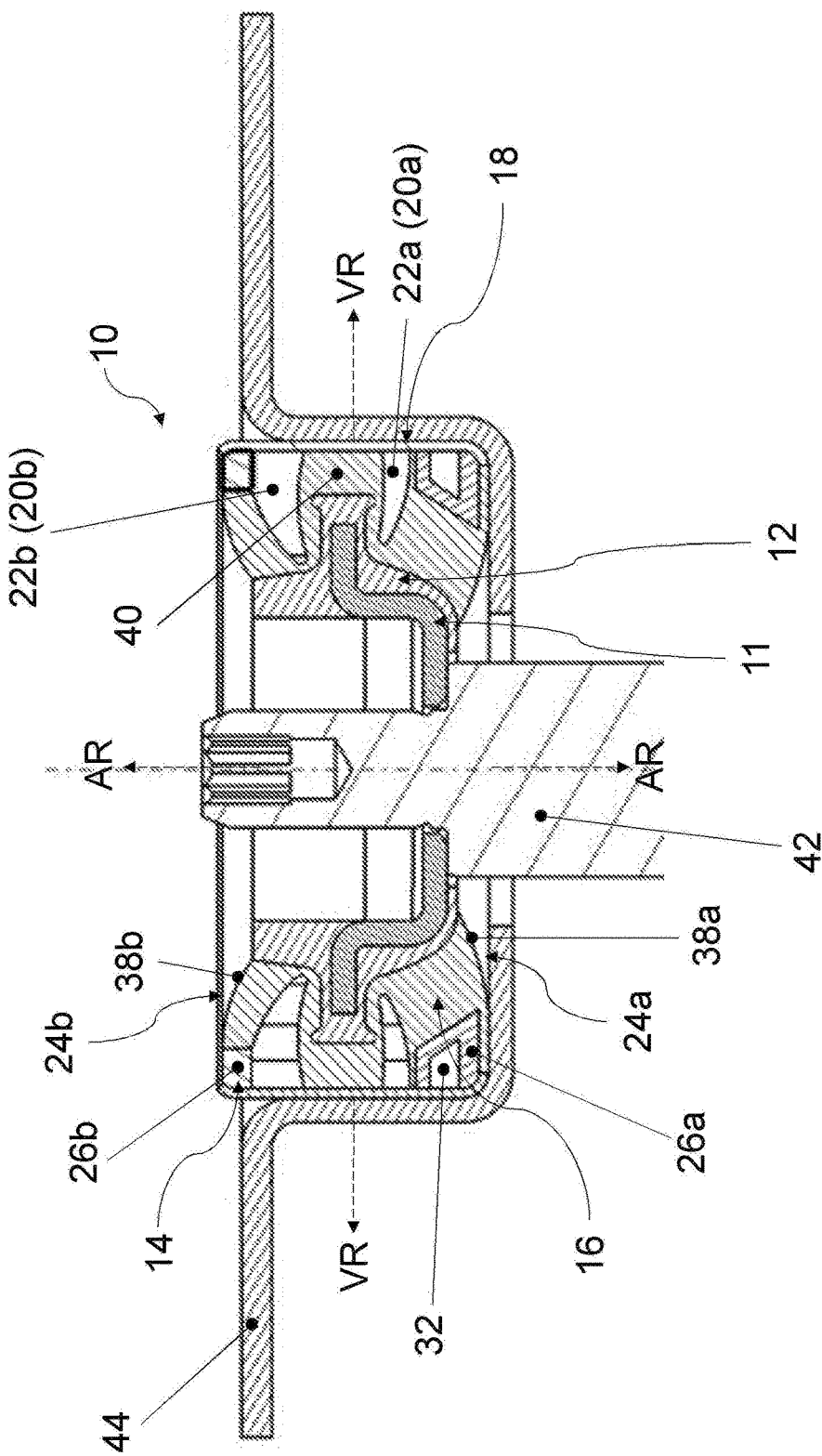
FIG. 3 is a cross-sectional view of a further embodiment of the mount according to the disclosure.

FIG. 3 shows a further embodiment of the mount 10, in which the mount 10 has been mounted on a shock absorber 42 and pressed into a flange 44. The cross-section shown has been rotated by 90° around the z-axis compared to the cross-section shown in FIG. 2, so that the predetermined, mutually opposite radial directions VR now run in the drawing plane. The mounting disc 11 is angled or bent in a hook- or L-shape in the radial edge region, which is overmolded with the plastic material of the inner core 12. A difference from the embodiment of the mount 10 shown in FIG. 1 and FIG. 2 is that the bottom membrane 38a of the elastomer body 16 is configured as a support spring and the cage 14 has no intermediate ring 30. The support ring 26a has a recess, which forms the fluid channel 32 limited in a radially outwards direction by the outer sleeve 18. The fluid chamber 22a is limited by the membrane 38a, the intermediate section 40 and the outer sleeve 18. The fluid chamber 22b is limited by the intermediate section 40, the membrane 38b, the outer sleeve 18 and the support ring 26b of the cage 14.

In the embodiment shown, the elastomer body 16 is configured such that there is no undercut in the axial direction AR on the axial end faces 24a and 24b of the elastomer body 16. In the radial direction VR, the elastomer body 16 appears not to be completely undercut-free in the region of the intermediate section 40. The perceived undercut is due to the fact that the mount 10 has been pressed into the flange 44 in the assembled state shown. The pressing-in causes the intermediate section 40 of the elastomer body 16 to deform, giving rise to the appearance that the elastomer body 16 is not undercut-free in the radial direction VR. In the unloaded state of the mount 10 after the production of the mount 10, however, the elastomer body 16 is completely undercut-free.

Figure 4:
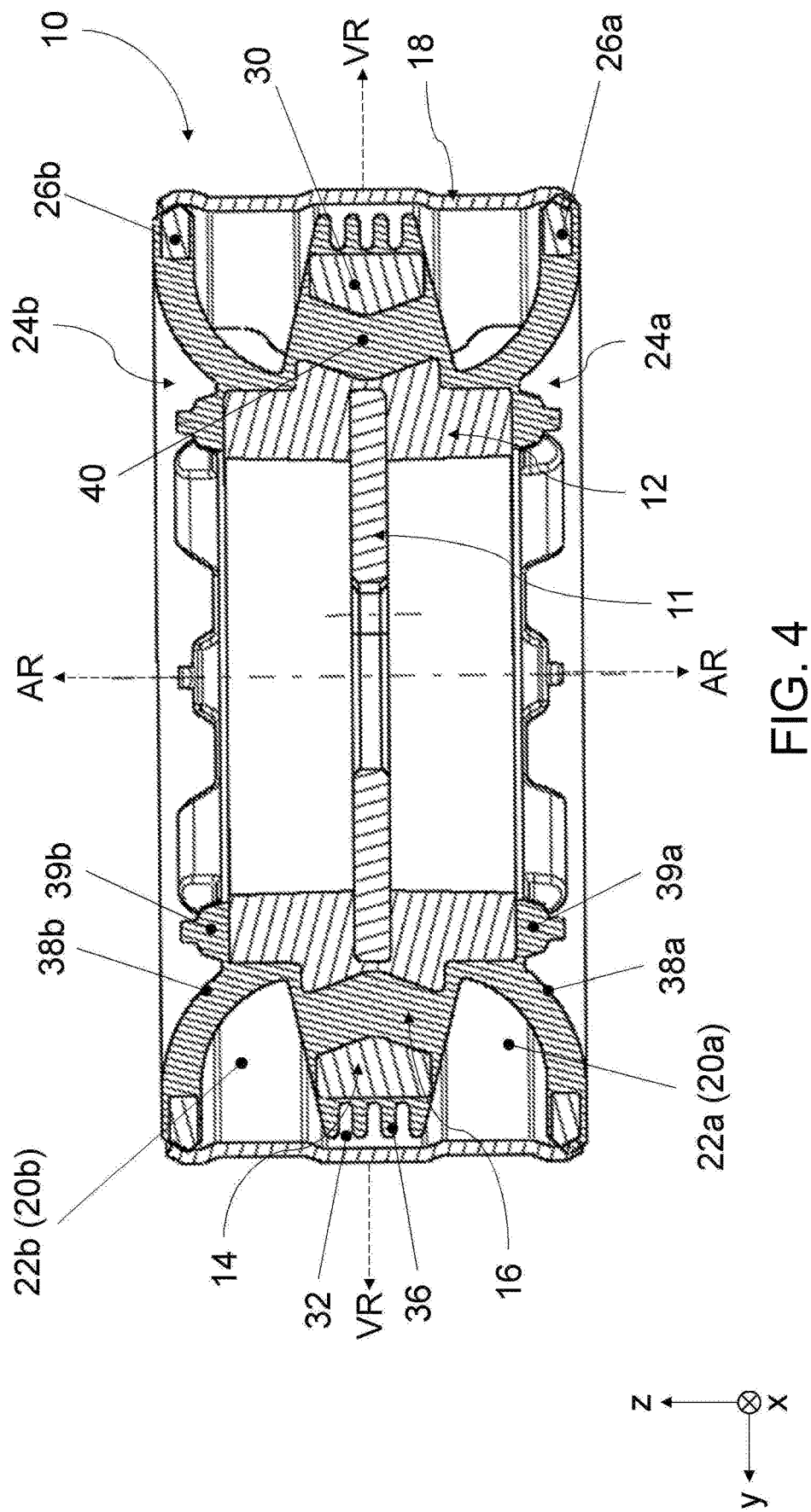
FIG. 4 is a cross-sectional view of a further embodiment of the mount according to the disclosure.

FIG. 4 shows a further embodiment of the mount 10. The construction shown is similar to the embodiment of the mount 10 shown in FIG. 2. As in FIG. 3, the cross-section shown has been rotated by 90° around the z-axis relative to the cross-section shown in FIG. 2. A difference consists in the fact that the cage 14, such as the intermediate ring 30, has no recess for the fluid channel 32, but the elastomer body 16 is shaped in such a way that fingers, lamellae or lips 36 project outwards in a radial direction from the elastomer body and substantially from the intermediate ring 30. The fluid channel 32 runs along the radial inside of the outer sleeve 18 in a vertical direction parallel to the z-axis and perpendicular to the lips 36, and is limited from the outside in a radial direction by the outer sleeve 18. The lips 36 can act as a pressure-relief valve and can regulate the flow of the damping fluid from the fluid chamber 22a into the fluid chamber 22b and vice versa. In other words, the fluid channel 32 has an annular configuration in a section through the mount 10 perpendicular to the direction of flow of the damping fluid, i.e. in a section perpendicular to the z-axis and therefore a longitudinal section of the mount 10. As shown in FIG. 2, the membranes 38a and 38b each have at least one bulge 39a and 39b located in the region of the inner core 12 and projecting axially from the inner core 12. The bulges 39a and 39b taper in a cuboid, pyramidal or prismatic fashion at their ends facing away from the inner core.

The elastomer body 16 of the mount 10 shown is configured so as to be undercut-free on its end faces 24a and 24b both in the axial direction AR and in the radial direction VR.

Figure 5:
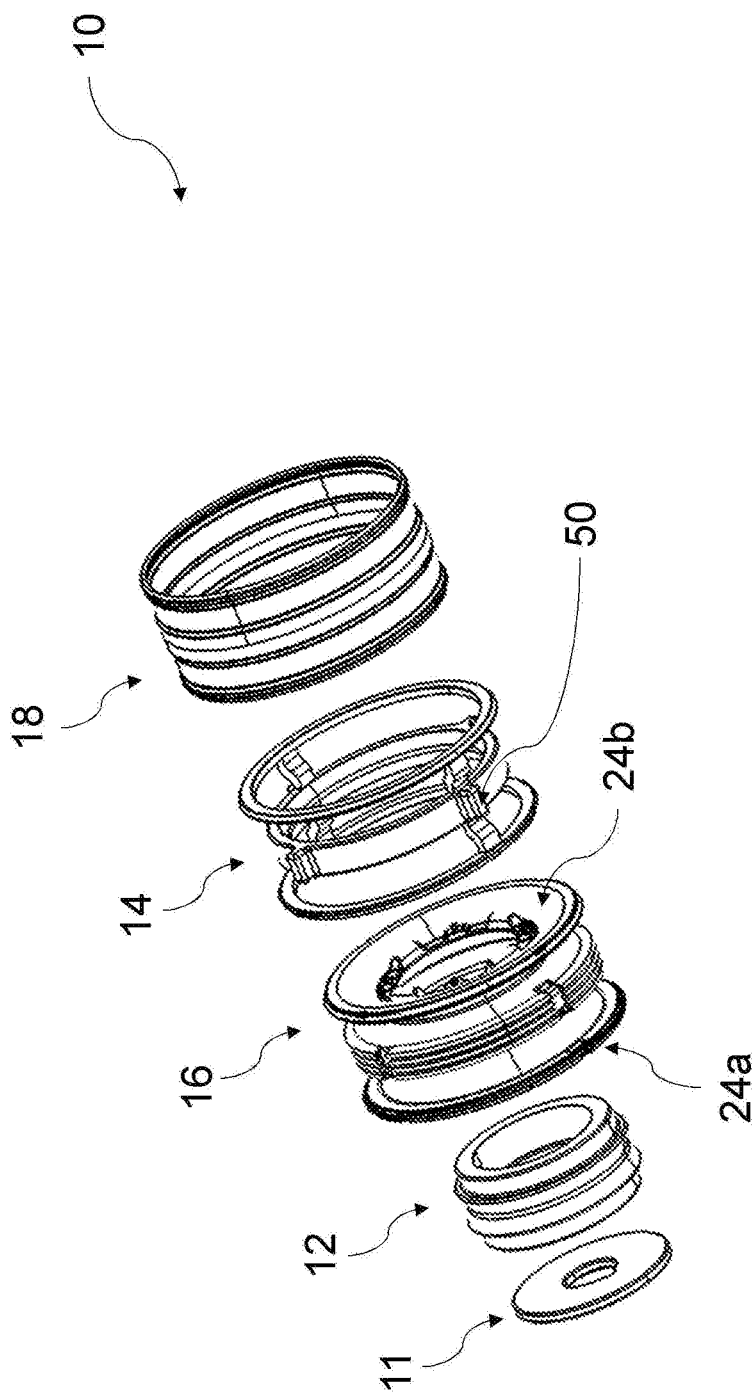
FIG. 5 is an exploded view of the embodiment according to FIG. 4.

FIG. 5 shows an exploded view of the mount 10 according to the construction shown in FIG. 4. The lips 36 of the elastomer body 16 run in a substantially annular fashion around the intermediate ring 30 of the cage 14 and thus around the z-axis of the system of coordinates shown. In addition, the cage 14 shown in FIG. 5 has, at approximately the level of the intermediate ring 30, radially outwardly projecting protrusions or supporting nubs 50 which, in the final assembled state of the mount 10, engage in or are inserted in a recess or step in the outer sleeve 18 that is provided for the purpose and are thus used for support when force is introduced into the mount 10. Through the geometry of the elastomer body 16 as shown, the damping fluid can flow axially, i.e. along the z-axis, along the outer sleeve 18 from one fluid chamber into the other fluid chamber when the mount 10 is under load by passing the lips 36.

Figure 6:
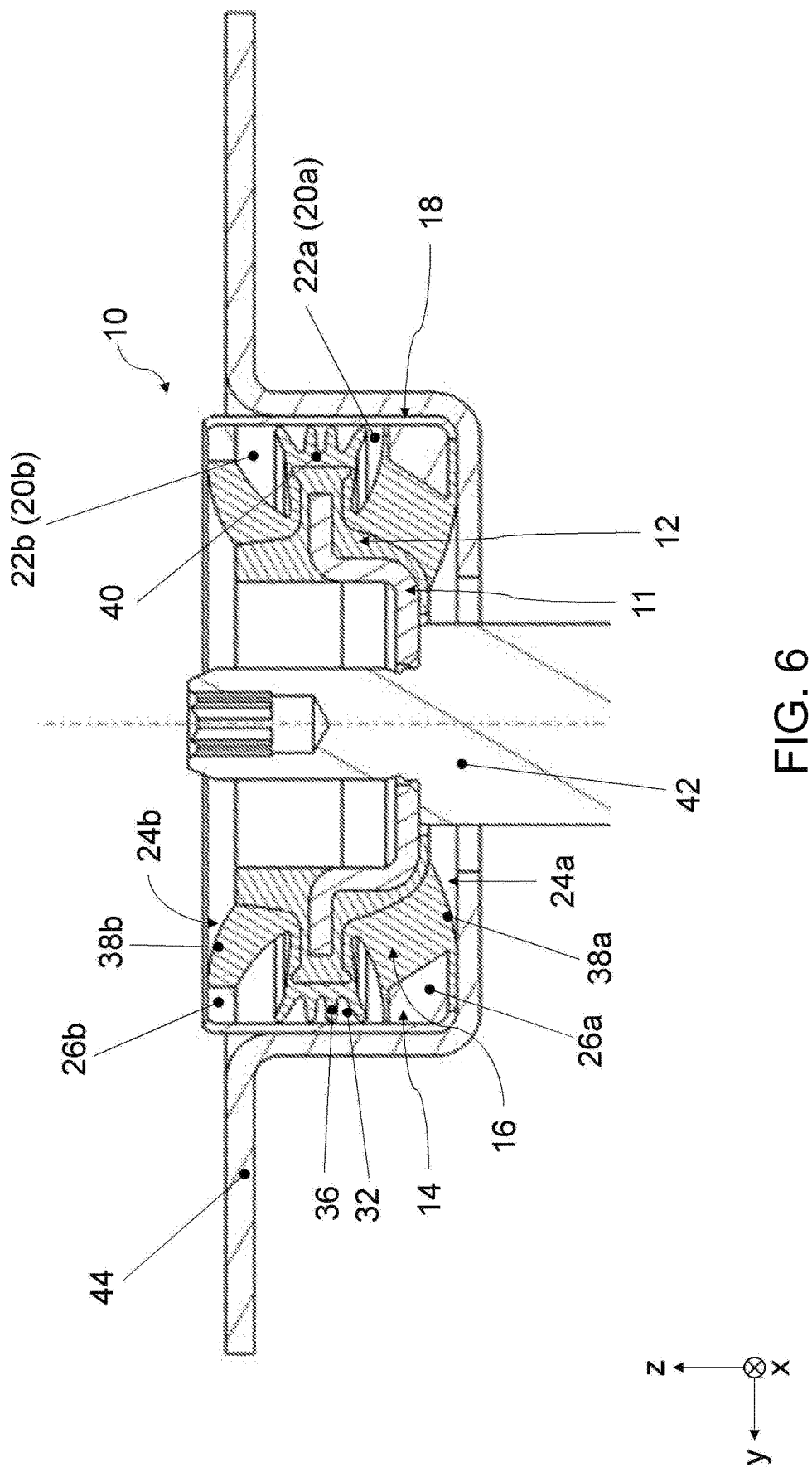
FIG. 6 is a cross-sectional view of a further embodiment of the mount according to the disclosure.

FIG. 6 shows a similar construction of the mount 10 to that shown in FIGS. 4 and 5. As shown in FIG. 3, the mount 10 is mounted on a shock absorber 42 and pressed into a flange 44. The mounting disc 11 is angled or bent in a hook- or L-shape in the radial edge region, which is overmolded with the inner core 12. A difference from the embodiment of the mount 10 shown in FIG. 4 and FIG. 5 is that the bottom membrane 38a of the elastomer body 16 is configured as a support spring and the cage 14 has no intermediate ring 30. The lips 36 of the elastomer body 16 substantially project outwards from the inner core 12 in a radial direction.

Similarly to FIG. 3, the elastomer body 16 shown in FIG. 6 is configured in such a way that there is substantially no undercut on the axial end faces 24a and 24b of the elastomer body 16. In the radial direction VR, the elastomer body 16 appears not to be completely undercut-free in the region of the lips 36. The perceived undercut can be due to the fact that the mount 10 has been pressed into the flange 44 in the assembled state shown. The pressing-in causes the readily deformable and vibratile lips 36 of the elastomer body 16 to deform, giving rise to the appearance that the elastomer body 16 is not undercut-free in the radial direction. In the unloaded state of the mount 10 after the production of the mount 10, however, the elastomer body 16 can be configured so as to be completely undercut-free. Alternatively, however, the elastomer body 16 can also be produced with a small degree of undercut in the radial direction VR in the region of the lips 36 since, owing to the readily deformable nature of the lips 36, the elastomer body 16 can nevertheless be easily demolded in the radial direction VR during production, or a withdrawal of a slider in the radial direction VR is easily possible during production. The lips 36 can, for example, be shaped such that they are bent or curved radially outwards and in an axial direction. Nevertheless, the elastomer body 16 is substantially undercut-free in the radial direction VR, since only a small degree of undercut is present and only in the region of the readily deformable lips 36.

Figure 7:
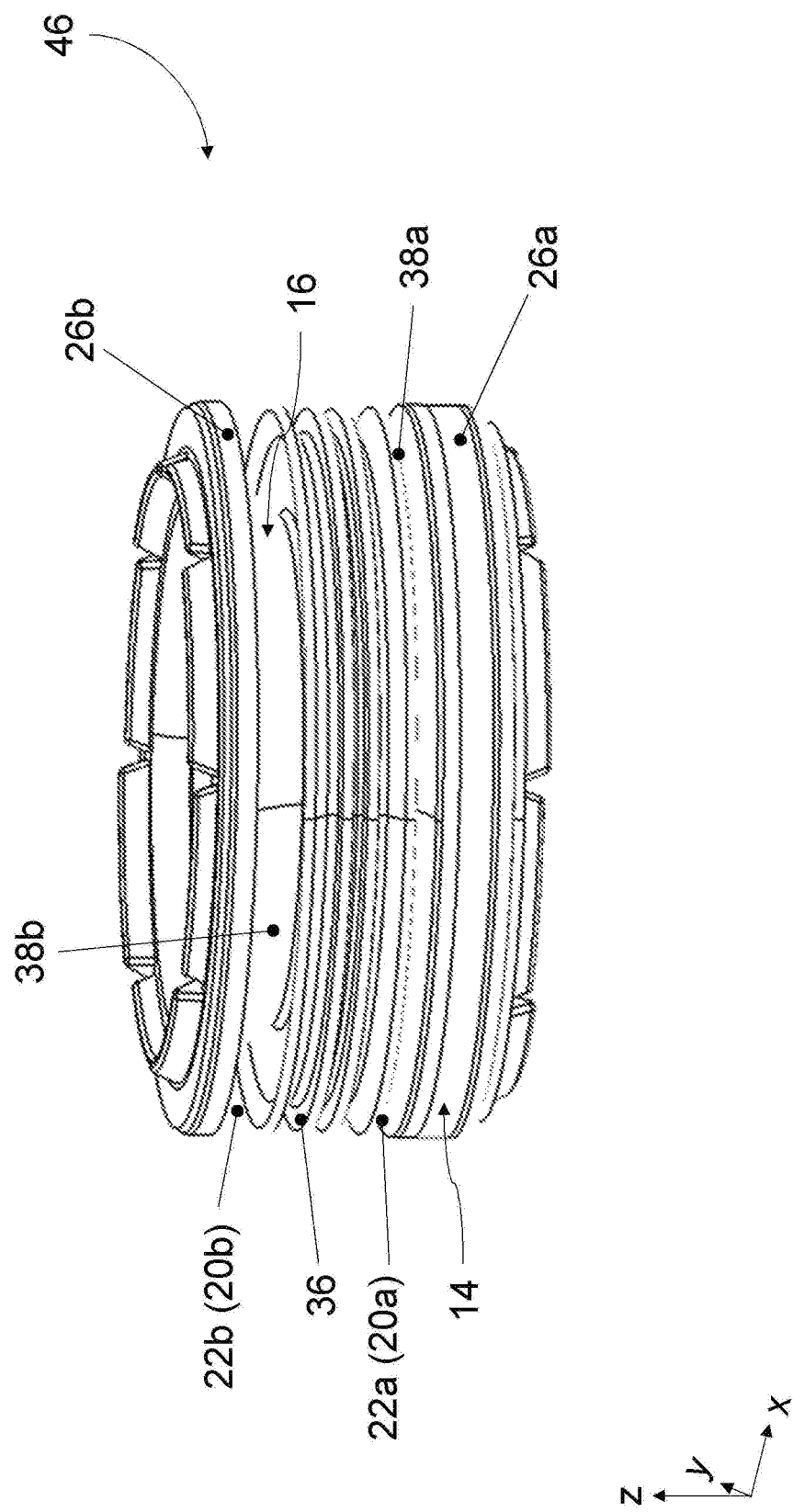
FIG. 7 is a perspective view of the embodiment of the mount according to FIG. 6 without an outer sleeve.

FIG. 7 shows a perspective view of the assembled mount 10 according to the embodiment shown in FIG. 6, but without the outer sleeve 18. Within the framework of this application, the mount 10 without the outer sleeve 18 is referred to as a mount component unit 46.

The mount component unit 46 illustrated is in the unloaded state. The lips 36 exhibit a slight curvature. FIG. 7 accordingly shows the case mentioned in the explanations relating to FIG. 6, in which the elastomer body 16 has a small degree of undercut in a radial direction caused by the curvature of the lips 36, but the elastomer body 16 is shaped so as to be substantially undercut-free in a radial direction since the lips 36 can be readily deformed and the elastomer body 16 can thus be easily demolded in the radial direction VR.

Figure 8:
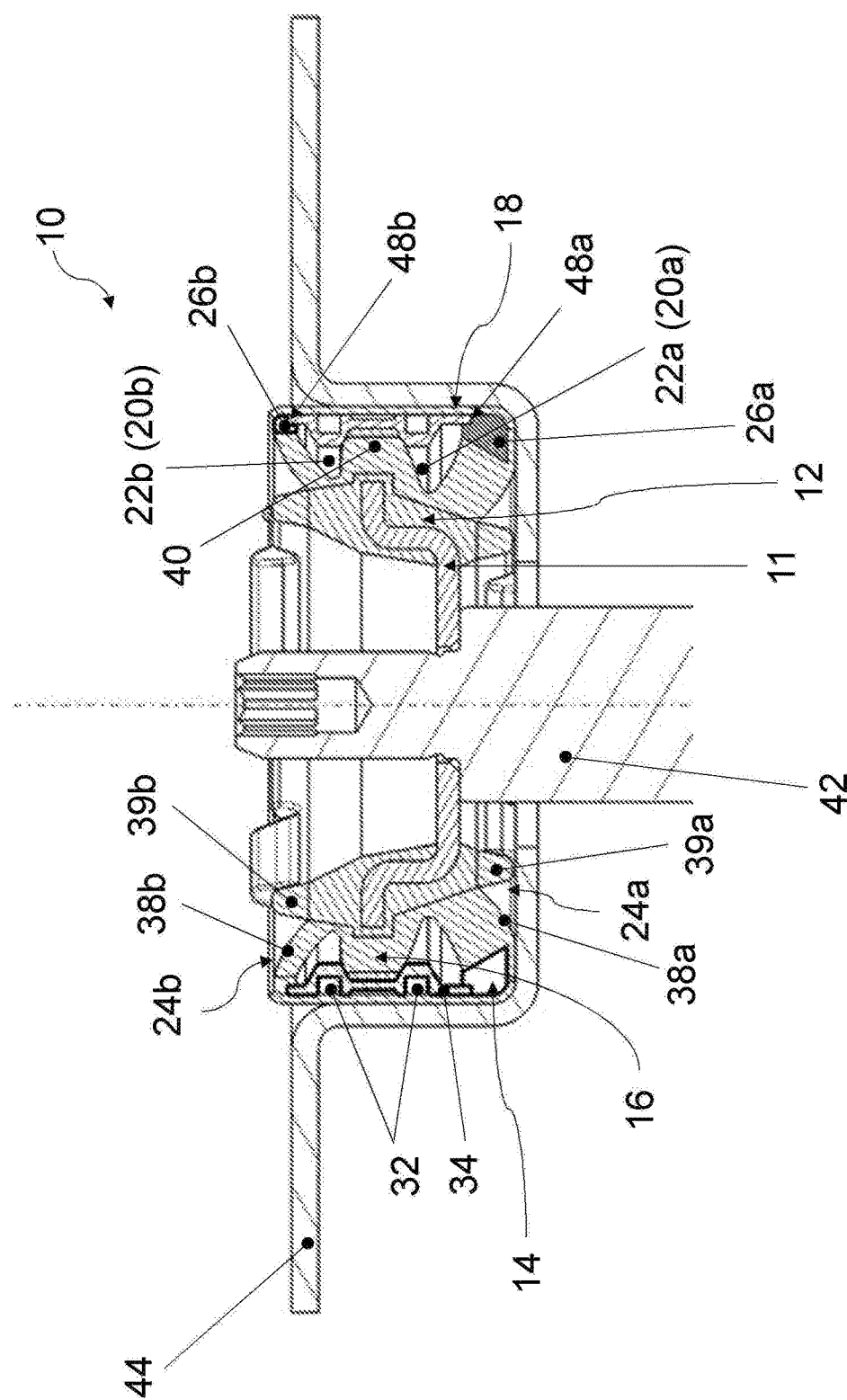
FIG. 8 is a cross-sectional view of a further embodiment of the mount according to the disclosure.

FIG. 8 shows a further embodiment of the mount 10. FIG. 8 shows a construction of the mount 10 in cross-section similar to that shown in FIGS. 3 and 6. The mount 10 is, as shown in FIG. 3, mounted on a shock absorber 42 and pressed into a flange 44. The mounting disc 11 is angled or bent in a hook- or L-shape in the radial edge region, which is overmolded with the inner core 12. The bottom membrane 38a of the elastomer body 16 here is configured as a support spring. Furthermore, the bottom membrane 38a and the top membrane 38b each have at least one pyramidal or prismatic bulge 39a and 39b, which project from the bottom and top axial edges of the inner core 12. According to this embodiment, the mount 10 additionally comprises a multi-part shell element 34, which is arranged between the elastomer body 16 and the outer sleeve 18. The fluid channel 32 is formed on the shell element 34. The shell element 34 is composed of plastic. By means of the support rings 26a and 26b, which can also be referred to as retaining rings, the multi-part shell element 34 is attached to the cage 14. The support rings 26a and 26b can have step-shaped support edges 48a and 48b, on which the shell element 34 can be arranged and can thus be braced or clamped between the retaining rings in an axial direction and held between the retaining rings radially from inside by the intermediate section 40 of the elastomer body 16 and radially from outside by the outer sleeve 18. The fluid channel 32, which is formed in the shell element 34, is designed such that the bottom fluid chamber 22a and the top fluid chamber 22b are fluidically connected, i.e. damping fluid can flow via the fluid channel 32 in the shell element 34 from one fluid chamber 22a into the other fluid chamber 22b or vice versa when the mount 10 is under load. The fluid chambers 22a and 22b are each limited by the elastomer body 16, the support ring 26a or 26b and the outer sleeve 18.

The elastomer body 16 is completely undercut-free on its end faces 24a and 24b in the radial direction VR and in the axial direction AR.

Figure 9:
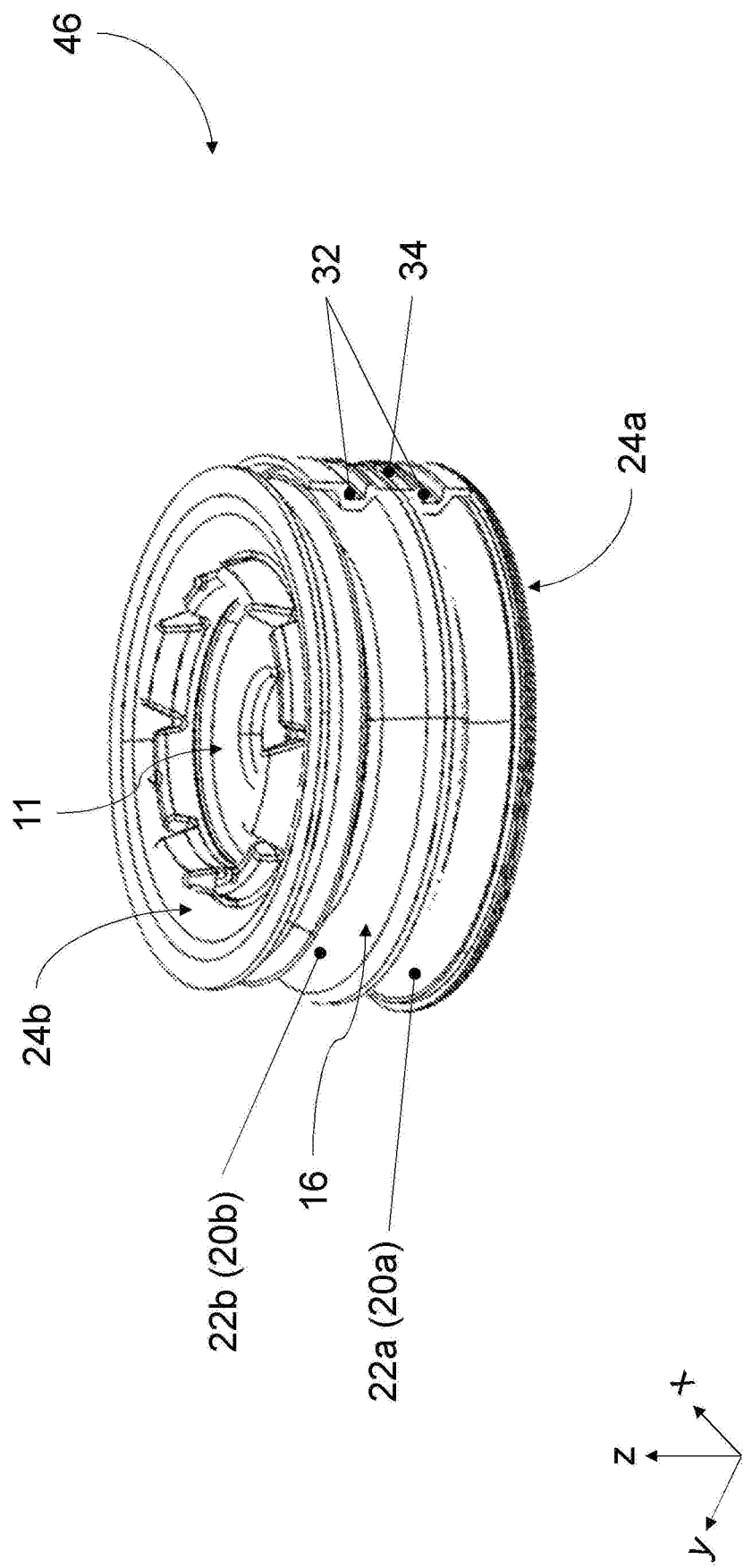
FIG. 9 is a perspective view of the embodiment of the mount according to FIG. 8 without an outer sleeve.
Figure 10:
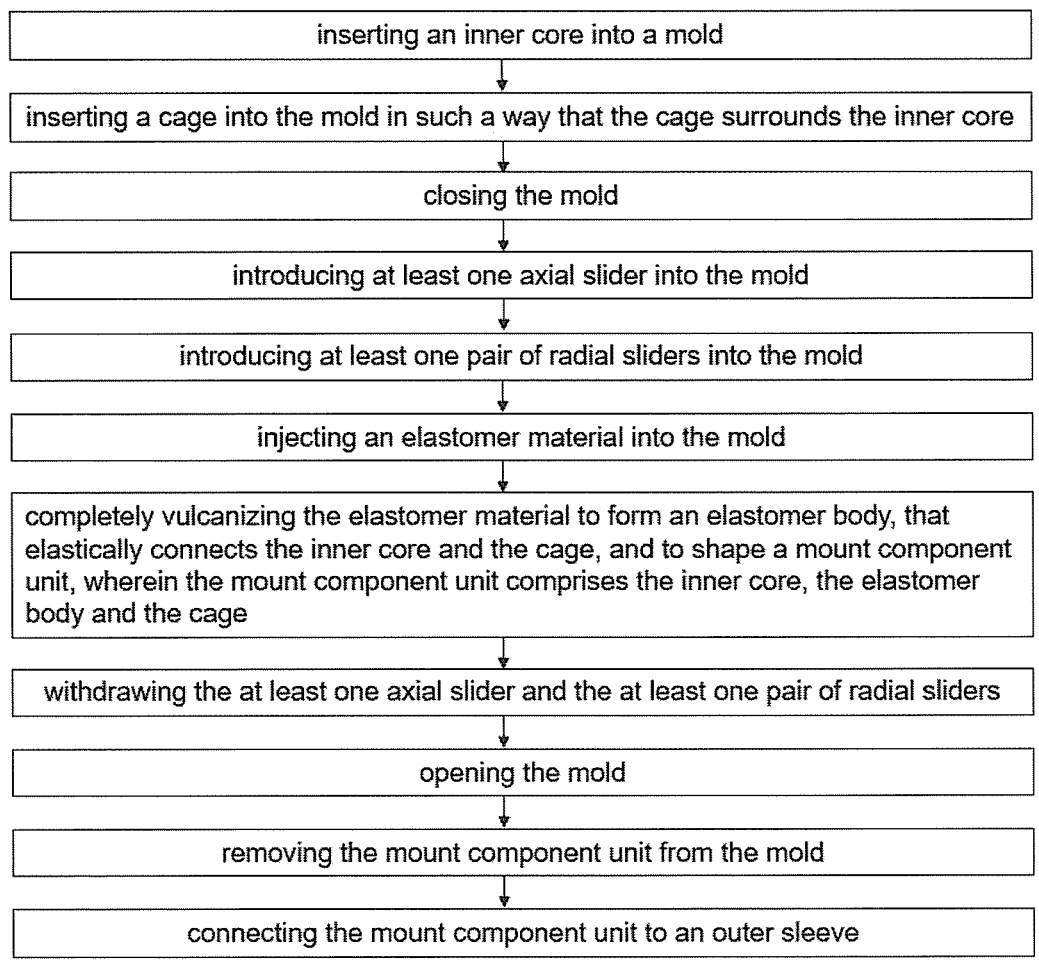
FIG. 10 shows a method of producing a hydraulic mount of the embodiment.
Figure 11:
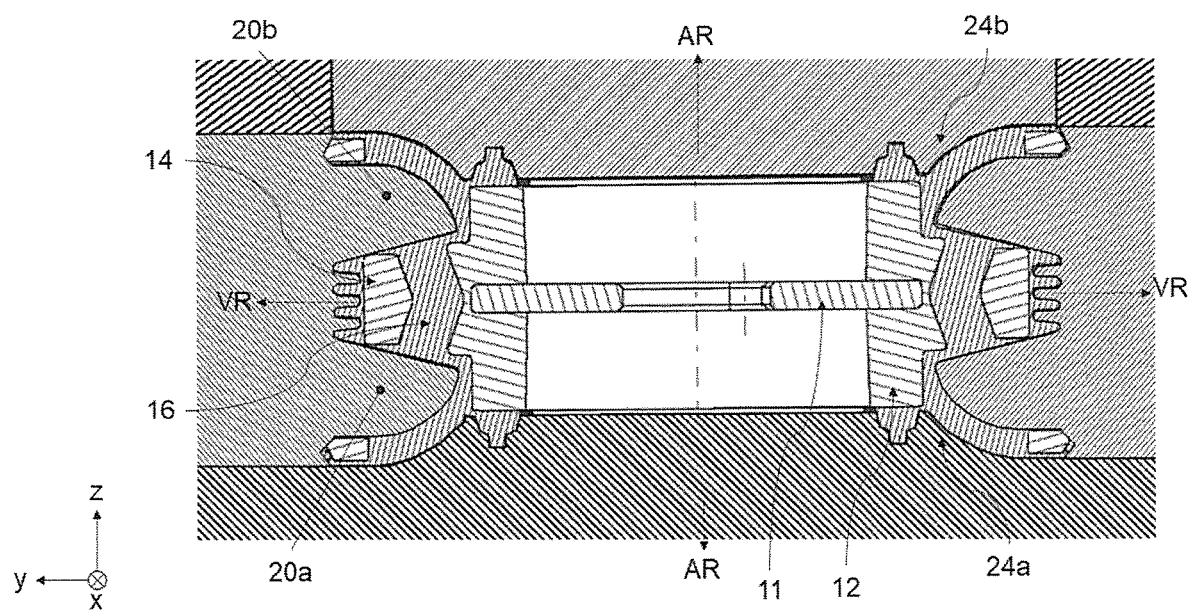
FIG. 11 shows a depiction of a partially produced hydraulic mount having a mounting disc, an inner core, a cage surrounding the inner core, and an elastomer body formed by injected elastomer material into the mold, in which the mold is closed and the sliders are introduced.
Figure 12:
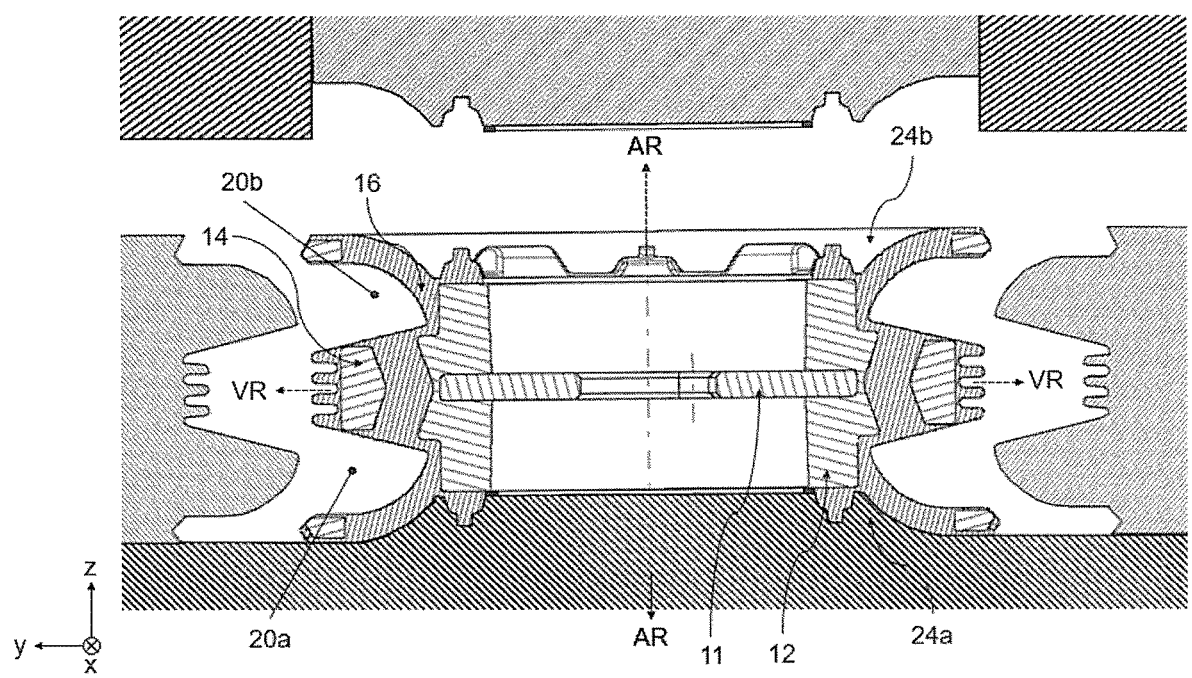
FIG. 12 shows the partially produced hydraulic mount of FIG. 11, in which the sliders are withdrawn and the mold is opened.

FIG. 9 shows a perspective illustration of the mount 10 without the outer sleeve 18, i.e. the mount component unit 46, according to the construction as shown in FIG. 8. The mount component unit 46 has been rotated by about 45° around the z-axis relative to the cross-section in FIG. 8.

What is claimed is:

1. A hydraulic mount, comprising:
   an inner core;
   a cage that surrounds the inner core;
   an elastomer body that extends between the inner core and the cage, and the elastomer body elastically connects the inner core and the cage to each other; and
   an outer sleeve that encloses the cage,
   wherein the elastomer body comprises a first circumferential fluid chamber recess and a second circumferential fluid chamber recess, wherein the first fluid chamber recess and the second fluid chamber recess are each limited in a radially outwards direction by the outer sleeve to form a first fluid chamber and a second fluid chamber, wherein, in the unloaded state of the elastomer body, the elastomer body is configured so as to be substantially undercut-free in an axial direction on axial end faces of the elastomer body, wherein, in the unloaded state of the elastomer body, the elastomer body and the cage are configured so as to be substantially undercut-free in the region of the first fluid chamber recess and the second fluid chamber recess, at least in two predetermined, mutually opposite radial directions, wherein the first fluid chamber and the second fluid chamber are fluidically connected to each other by way of a fluid channel, wherein the fluid channel is limited by the outer sleeve in the radially outwards direction, wherein the hydraulic mount further comprises a multi-part shell element, which is arranged between the elastomer body and the outer sleeve, and wherein the fluid channel is formed on the multi-part shell element.

2. The hydraulic mount according to claim 1,
wherein the cage has a first support ring and a second support ring,
wherein the first support ring is arranged on a first axial end section of the hydraulic mount,
wherein the second support ring is arranged on a second axial end section of the hydraulic mount which is opposite the first axial end section, and
wherein the first fluid chamber and the second fluid chamber are arranged between the first support ring and the second support ring in the axial direction.

3. The hydraulic mount according to claim 2,
wherein the cage has two connecting webs that extend in the axial direction between the first support ring and the second support ring, and the connecting webs connect the first support ring and the second support ring, and
wherein the two connecting webs are arranged at two diametrically opposed positions of the first support ring and of the second support ring transverse to the predetermined, mutually opposite radial directions.

4. The hydraulic mount according to claim 3,
wherein the cage has an intermediate ring, which is arranged between the first support ring and the second support ring in the axial direction, and the intermediate ring is connected to the first support ring and the second support ring by way of the two connecting webs.

5. The hydraulic mount according to claim 4,
wherein the fluid channel is formed at least partially on the cage, and at least partially on the first support ring, on the second support ring, on one or both connecting webs and/or on the intermediate ring.

6. The hydraulic mount according to claim 4,
wherein the fluid channel is formed on the elastomer body between the first fluid chamber recess and the second fluid chamber recess,
wherein the elastomer body has at least one lip projecting substantially radially outwards in the region of the fluid channel, which extends along a circumferential direction of the elastomer body.

7. The hydraulic mount according to claim 6,
wherein the elastomer body is supported radially from inside by the intermediate ring in the region of the fluid channel.

8. A hydraulic mount, comprising:
an inner core;
a cage that surrounds the inner core;
an elastomer body that extends between the inner core and the cage, and the elastomer body elastically connects the inner core and the cage to each other; and
an outer sleeve that encloses the cage,
wherein the elastomer body comprises a first circumferential fluid chamber recess and a second circumferential fluid chamber recess,
wherein the first fluid chamber recess and the second fluid chamber recess are each limited in a radially outwards direction by the outer sleeve to form a first fluid chamber and a second fluid chamber,
wherein, in the unloaded state of the elastomer body, the elastomer body is configured so as to be substantially undercut-free in an axial direction on axial end faces of the elastomer body,
wherein, in the unloaded state of the elastomer body, the elastomer body and the cage are configured so as to be substantially undercut-free in the region of the first fluid chamber recess and the second fluid chamber recess, at least in two predetermined, mutually opposite radial directions,
wherein the first fluid chamber and the second fluid chamber are fluidically connected to each other by way of a fluid channel,
wherein the fluid channel is limited by the outer sleeve in the radially outwards direction,
wherein the fluid channel is formed on the elastomer body between the first fluid chamber recess and the second fluid chamber recess,
wherein the elastomer body has at least one lip projecting substantially radially outwards in the region of the fluid channel, which extends along a circumferential direction of the elastomer body, and
wherein the elastomer body is supported radially from inside by the inner core in the region of the fluid channel.

9. A hydraulic mount, comprising:
an inner core;
a cage that surrounds the inner core;
an elastomer body that extends between the inner core and the cage, and the elastomer body elastically connects the inner core and the cage to each other; and
an outer sleeve that encloses the cage,
wherein the elastomer body comprises a first circumferential fluid chamber recess and a second circumferential fluid chamber recess,
wherein the first fluid chamber recess and the second fluid chamber recess are each limited in a radially outwards direction by the outer sleeve to form a first fluid chamber and a second fluid chamber,
wherein, in the unloaded state of the elastomer body, the elastomer body is configured so as to be substantially undercut-free in an axial direction on axial end faces of the elastomer body, undercut on the elastomer body, or there is only a small degree of undercut on the elastomer body,
wherein, in the unloaded state of the elastomer body, the elastomer body and the cage are configured so as to be substantially undercut-free in the region of the first fluid chamber recess and the second fluid chamber recess, at least in two predetermined, mutually opposite radial directions,
wherein the elastomer body has a first membrane, a second membrane and an intermediate section, wherein the first fluid chamber is limited by the first membrane in an axially outwards direction,
wherein the second fluid chamber is limited by the second membrane in the axially outwards direction,
wherein the intermediate section is arranged between the first fluid chamber and the second fluid chamber in the axial direction, and
wherein the first membrane and/or the second membrane are of convex configuration.

10. The hydraulic mount according to claim 9,
wherein the first membrane, the second membrane and/or the intermediate section is/are configured as a support spring.

11. A method of producing a hydraulic mount, comprising:
inserting an inner core into a mold;
inserting a cage into the mold in such a way that the cage surrounds the inner core;
closing the mold;
introducing at least one axial slider into the mold;
introducing at least one pair of radial sliders into the mold;
injecting an elastomer material into the mold;
completely vulcanizing the elastomer material to form an elastomer body, that elastically connects the inner core and the cage, and to shape a mount component unit, wherein the mount component unit comprises the inner core, the elastomer body and the cage;
withdrawing the at least one axial slider and the at least one pair of radial sliders;
opening the mold;
removing the mount component unit from the mold;
arranging a multi-part shell element at the elastomer body; and
connecting the mount component unit to an outer sleeve;
wherein the elastomer body comprises a first circumferential fluid chamber recess and a second circumferential fluid chamber recess,
wherein the first fluid chamber recess and the second fluid chamber recess are each limited in a radially outwards direction by the outer sleeve to form a first fluid chamber and a second fluid chamber,
wherein the first fluid chamber and the second fluid chamber are fluidically connected to each other by way of a fluid channel,
wherein the fluid channel is limited by the outer sleeve in the radially outwards direction,
wherein the multi-part shell element is arranged between the elastomer body and the outer sleeve, and
wherein the fluid channel is formed on the multi-part shell element.

12. A method of producing a hydraulic mount, comprising:
inserting an inner core into a mold;
inserting a cage into the mold in such a way that the cage surrounds the inner core;
closing the mold;
introducing at least one axial slider into the mold;
introducing at least one pair of radial sliders into the mold;
injecting an elastomer material into the mold;
completely vulcanizing the elastomer material to form an elastomer body, that elastically connects the inner core and the cage, and to shape a mount component unit, wherein the mount component unit comprises the inner core, the elastomer body and the cage;
withdrawing the at least one axial slider and the at least one pair of radial sliders;
opening the mold;
removing the mount component unit from the mold;
connecting the mount component unit to an outer sleeve;
wherein the elastomer body comprises a first circumferential fluid chamber recess and a second circumferential fluid chamber recess,
wherein the first fluid chamber recess and the second fluid chamber recess are each limited in a radially outwards direction by the outer sleeve to form a first fluid chamber and a second fluid chamber,
wherein the first fluid chamber and the second fluid chamber are fluidically connected to each other by way of a fluid channel,
wherein the fluid channel is limited by the outer sleeve in the radially outwards direction wherein the fluid channel is formed on the elastomer body between the first fluid chamber recess and the second fluid chamber recess,
wherein the elastomer body has at least one lip projecting substantially radially outwards in the region of the fluid channel, which extends along a circumferential direction of the elastomer body, and wherein the elastomer body is supported radially from inside by the inner core in the region of the fluid channel.

13. A method of producing a hydraulic mount, comprising:
inserting an inner core into a mold;
inserting a cage into the mold in such a way that the cage surrounds the inner core;
closing the mold;
introducing at least one axial slider into the mold;
introducing at least one pair of radial sliders into the mold;
injecting an elastomer material into the mold;
completely vulcanizing the elastomer material to form an elastomer body, that elastically connects the inner core and the cage, and to shape a mount component unit, wherein the mount component unit comprises the inner core, the elastomer body and the cage;
withdrawing the at least one axial slider and the at least one pair of radial sliders;
opening the mold;
removing the mount component unit from the mold;
connecting the mount component unit to an outer sleeve;
wherein the elastomer body comprises a first circumferential fluid chamber recess and a second circumferential fluid chamber recess,
wherein the first fluid chamber recess and the second fluid chamber recess are each limited in a radially outwards direction by the outer sleeve to form a first fluid chamber and a second fluid chamber,
wherein the elastomer body has a first membrane, a second membrane and an intermediate section,
wherein the first fluid chamber is limited by the first membrane in an axially outwards direction,
wherein the second fluid chamber is limited by the second membrane in the axially outwards direction,
wherein the intermediate section is arranged between the first fluid chamber and the second fluid chamber in the axial direction, and
wherein the first membrane and/or the second membrane are of convex configuration.

* * * * *